(12) United States Patent
Robey (10) Patent No.: US 7,021,461 B1
(45) Date of Patent: Apr. 4, 2006

(54) VEHICLE SHIPPING RACK AND RELATED METHODS

(75) Inventor: Dennis P. Robey, Elizabethtown, KY (US)

(73) Assignee: Keyboard Carriage, Elizabethtown, KY (US)

( * ) Notice: Subject to any disclaimer, the term of this patent is extended or adjusted under 35 U.S.C. 154(b) by 0 days.

(21) Appl. No.: 10/701,224

(22) Filed: Nov. 4, 2003

(51) Int. Cl.
*B65D 85/68* (2006.01)
*A47F 7/00* (2006.01)
*B60P 7/08* (2006.01)

(52) U.S. Cl. .................... 206/335; 211/5; 211/17; 211/22; 220/1.5; 220/6; 410/3; 410/30

(58) Field of Classification Search .......... 206/335, 206/386, 600; 211/5, 17, 22, 20; 410/3, 410/30; 414/234, 252; 220/1.5, 6–8
See application file for complete search history.

(56) References Cited

U.S. PATENT DOCUMENTS

| | | | |
|---|---|---|---|
| 1,973,372 A * | 9/1934 | Clapp | 220/1.5 |
| 3,393,935 A | 7/1968 | James | |
| 3,591,029 A | 7/1971 | Coffey | |
| 3,620,388 A * | 11/1971 | Mansson | 108/53.1 |
| 3,843,001 A | 10/1974 | Willis | |
| 3,912,139 A | 10/1975 | Bowman | |
| D295,163 S | 4/1988 | Erdman | |
| 4,804,087 A * | 2/1989 | Smith | 206/335 |
| 4,805,954 A | 2/1989 | Lazaroff | |
| 4,991,715 A * | 2/1991 | Williams | 206/335 |
| 5,133,453 A | 7/1992 | Fritze | |
| 5,593,259 A | 1/1997 | Kuo | |
| 5,749,685 A | 5/1998 | Hain | |
| 6,006,676 A | 12/1999 | Creek et al. | |
| 6,109,494 A | 8/2000 | Pilmore | |
| 6,585,126 B1 * | 7/2003 | Grigsby et al. | 220/6 |
| 2002/0139798 A1 * | 10/2002 | Logan et al. | 220/7 |

FOREIGN PATENT DOCUMENTS

DE 3218861 A1 5/1982
JP 5-221483 * 8/1993

* cited by examiner

Primary Examiner—Bryon P. Gehman
(74) Attorney, Agent, or Firm—King & Schickli, PLLC (57) ABSTRACT

Disclosed is a rack for supporting a vehicle, such as a motorcycle, during shipping. In one embodiment, the rack includes selectively actuated support assemblies, each having a rotatably mounted wheel. In the actuated position, the wheels facilitate movement of the rack and vehicle together. In this and possibly another embodiment, the rack includes a protective assembly having an upstanding guard mounted on opposed sides of a base in the form of a generally rectangular frame. Each protective assembly with the upstanding guard may move between a first, retracted position adjacent to the corresponding side of the frame and a second, extended position farther away from that side of the frame. The guard is also collapsible, including when the protective assembly is in the retracted position, to provide the rack with a low profile when not in use. Related methods are also disclosed, including a method of retrofitting an existing shipping rack to include the disclosed protective and support assemblies.

23 Claims, 11 Drawing Sheets

VEHICLE SHIPPING RACK AND RELATED METHODS

TECHNICAL FIELD

This invention relates generally to the vehicle shipping and transportation arts and, more particularly, to an improved rack for intended use in the course of shipping a wheeled vehicle, such as a motorcycle.

BACKGROUND OF THE INVENTION

Various types of racks for use in shipping vehicles such as motorcycles are known in the art. A typical modern arrangement is illustrated in U.S. Pat. No. 5,133,453 to Fritze, and includes a base supporting a ramped center receiver or guide channel adapted for receiving the wheels of the motorcycle. Once the motorcycle is in the appropriate position on the rack, hold down straps maintain the motorcycle in the upright position (which is usually the desired orientation for shipping). During the unloading sequence, the straps are simply released and the motorcycle is backed through the channel, down the ramp, and onto the ground.

Although the arrangement in the Fritze patent facilitates the loading and unloading the motorcycle from the rack, it suffers from several significant shortcomings. First of all, nothing on the rack guards or protects the associated motorcycle against damage from external sources, including adjacent motorcycles, racks, or other structures that may be encountered during shipping. Any resulting damage is typically the responsibility of the common carrier, and can be a significant source of loss.

Secondly, no manner of easily moving the rack, including with the motorcycle in the mounted condition, is provided. Thus, in the typical scenario, the rack with the motorcycle is loaded into the shipping container, such as a trailer, using a forklift or other lifting means. The motorcycle on the rack (which together can weigh in excess of one thousand pounds) is then pushed about the trailer into the desired location for shipping. As should be appreciated, this is extraordinarily difficult to accomplish in the confines of the trailer, especially when the rack is surrounded by other racks or cargo. At the offload point, this time-consuming procedure must be repeated in reverse and a forklift or similar lifting device is again required. As can be readily appreciated, the deleterious complexity of this operation significantly increases the overall shipping cost, and can further increase the chances of damage to the motorcycles.

A slightly more modern approach is found in German Published Application No. DE 199 34 939 A1. Like the one shown in the Fritze patent, the shipping rack disclosed in this patent application includes a center channel for receiving the motorcycle wheels, as is conventional. An improvement feature is the provision of collapsible posts positioned at each of the four corners of the rack. These posts of course reduce the likelihood of external damage and, thus, provide a modicum of protection for the motorcycle during transit.

Despite the slight improvement afforded by this added feature, limitations still exist. For example, no manner of easily moving this rack is part of the approach disclosed in the '939 application, either. Consequently, the same deleterious loading and unloading sequence must be followed prior to shipping in a larger container, such as a trailer, as well as when off-loading the motorcycle at the final destination. Moreover, despite being collapsible, the upstanding posts are mounted at fixed locations on the rack, and thus are not adaptable for use with different types or widths of motorcycles. Moreover, positioning fixed posts at only the corners leaves significant portions of the sides of the motorcycle susceptible to damage, including from adjacent cargo.

Accordingly, a need is identified for an improved rack for use in the course of shipping vehicles. The rack would be better able to guard against damage to the corresponding vehicle from external sources, including adjacent vehicles or other cargo. Moving the rack and vehicle together over the ground and into a shipping container would also be facilitated. This feature would reduce the time and cost associated with loading a vehicle into a shipping container, as well as unloading at the final destination. Overall, a rack combining both features would be a considerable improvement over those described in the foregoing discussion, without requiring significant additional manufacturing cost. Retrofitting existing racks to enhance mobility and to help better protect vehicles such as motorcycles against damage would also be desirable.

SUMMARY OF THE INVENTION

In accordance with one aspect of the invention, an apparatus for intended use in the course of shipping a vehicle, such as a motorcycle having at least two rotatable wheels for engaging the ground is disclosed. The apparatus comprises a base for supporting the vehicle above the ground. The base includes opposed first and second sides with at least one guard or protective assembly supported by the base for movement from a retracted position adjacent the first side of the base to an extended upstanding position in which the guard is away from the base. The guard or protective assembly may include a generally upstanding post. As a result, the guard assists in protecting the vehicle when positioned on the base from being damaged during shipping in both the extended and retracted positions. The apparatus may include a plurality of retractable supports for raising the base above the ground during shipping.

In one embodiment, the base is a generally rectangular frame having first and second, elongated sides defining a longitudinal direction and third and fourth sides defining a transverse direction. A plurality of support assemblies are mounted to the frame, each capable of moving to an actuated position in which support is provided for the frame above the ground. Each support assembly may include a rotatably mounted wheel supported by a hinge plate secured to the frame for pivoting movement about an axis aligned with the transverse direction. Each support assembly thus pivots to reach the actuated position.

To lock or hold each support assembly in the actuated position, a stop may be provided. In one embodiment, the stop has a first, inactive or withdrawn position for allowing the corresponding support assembly to retract and a second, active position for maintaining each support assembly in the actuated position.

The frame may further include two pairs of cross members aligned with the transverse direction. Each pair may create a space capable of receiving a portion of each vehicle wheel so as to prevent movement in the longitudinal direction. A pair of connectors may extend between each pair of cross members, with each support assembly mounted to one of the pair of connectors and a corresponding elongated side of the frame. As a result, the support assembly is adapted for pivoting movement between the cross members.

The guard may be a post mounted for pivoting movement from the upstanding position for guarding the vehicle to a collapsed position. This collapsing may occur when the protective assembly is in the first, retracted position. The guard is attached to an arm mounted to a corresponding side of the base or frame for pivoting movement in a common plane with the base, and is removably secured to an open-ended receiver supported by the arm. Specifically, the receiver includes aligned slots for receiving a first pin associated with the post and a pair of aligned apertures for receiving a second pin extending through a pair of aligned, J-shaped slots formed in the post. As a result of this arrangement, the second pin moves through the J-shaped slots when the post is raised and then lowered to the collapsed position.

The apparatus may be used in combination with a removable trough at least partially supporting the vehicle in an upright position. Preferably, the trough is secured to the base during use. Alternatively, the apparatus may be used simply with the vehicle alone.

In accordance with a second aspect of the invention, an apparatus for intended use in shipping a vehicle having wheels for engaging the ground is disclosed. The apparatus comprises a base adapted for receiving and supporting the vehicle above the ground. The base includes first and second opposed sides, and an upstanding guard is associated with each side for protecting the vehicle. A plurality of support assemblies each include a rotatable wheel and are mounted to the base for pivoting movement from a retracted position and an actuated position in which the wheels help support the base above the ground. As a result, the base may rest on the ground when the support assemblies are in the retracted position and the wheels facilitate moving the apparatus, including with the vehicle, when these assemblies are in the actuated position.

In one embodiment, each support assembly includes a transverse axle rotatably supporting the wheel, the axle in turn being supported by a hinge plate secured to the base for pivoting movement. A stop is also associated with each support assembly. The stop may assume a first inactive or withdrawn position for allowing the corresponding support assembly to retract and a second active position for maintaining each support assembly in the actuated position.

In this or a different embodiment, the base comprises a generally rectangular frame. Each guard is preferably an upstanding post mounted for pivoting movement from a first position adjacent the corresponding side of the frame to a second, extended position farther away from that side of the frame. Furthermore, the post is mounted for pivoting movement between the upstanding position for guarding the vehicle and a collapsed position for storage. The post may be supported by an arm mounted to a corresponding side of the frame for pivoting movement including a receiver. The receiver further includes aligned slots for receiving a first pin associated with the post and a pair of aligned apertures for receiving a second pin extending through a pair of aligned, J-shaped slots formed in the post. As a result, the second pin is captured in and negotiates the J-shaped slots as the post moves to the collapsed position.

In accordance with a third aspect of the invention, an apparatus for intended use in the course of shipping a vehicle, such as a motorcycle having rotatable wheels for engaging the ground is disclosed. The apparatus comprises a generally rectangular frame adapted for receiving and supporting the vehicle above the ground. Means for protecting the vehicle against damage when positioned on the frame is also provided, as is selectively actuated means for facilitating movement of the frame over the ground with low-friction, rolling contact.

In one embodiment, the protecting means comprises at least one protective assembly positioned along each side of the frame and including a generally upstanding guard. Each protective assembly is mounted for pivoting movement from a first, retracted position such that the upstanding guard is adjacent the corresponding side of the frame to a second, extended position in which the upstanding guard is away from the frame. In a more preferred embodiment, each guard is a post selectively movable between an upstanding position and a collapsed position.

In this or a different embodiment, the movement facilitating means comprises a plurality of support assemblies, each including a rotatably mounted wheel. Each support assembly is mounted to the frame for pivoting movement. Specifically, the pivoting is from a retracted position to an actuated position in which the wheel makes low friction, rolling contact with the ground and supports the frame above it in a stable fashion.

In accordance with a fourth aspect of the invention, a method of loading at least one motorcycle into a shipping container, such as a trailer, using a base including a plurality of selectively actuated wheels is disclosed. The method comprises placing the motorcycle on the base; actuating the wheels; and wheeling the base including the motorcycle into the shipping container. The method may further comprise the steps of retracting the wheels after the wheeling step. The method may also comprise securing the base to the container to prevent relative up and down movement during transit.

In accordance with a fifth aspect of the invention, a method of protecting a motorcycle when associated with a rack and loaded into a shipping container is disclosed. The method comprises pivotally mounting a protective assembly including an upstanding post along at least two different sides of the rack; and pivoting the protective assembly with the upstanding post from a first, retracted position closer to the side of the rack and a second, extended position farther away from the rack. The method may further comprise the step of collapsing the upstanding post, including when the protective assembly is in the retracted position.

In accordance with a sixth aspect of the invention, a method of retrofitting an existing motorcycle shipping rack is disclosed. The method comprises pivotally mounting a protective assembly including an upstanding post along at least two different sides of the rack and pivotally mounting a plurality of retractable support assemblies to the rack, each support assembly including a rotatably mounted wheel. As a consequence of the retrofitting, the upstanding posts protect the motorcycle against damage during shipping and the wheels may engage the ground to facilitate moving the rack and the motorcycle together.

BRIEF DESCRIPTION OF THE DRAWINGS

The accompanying drawings incorporated in and forming a part of the specification, illustrate several aspects of the present invention, and together with the description serve to explain the principles of the invention. In the drawings:

FIG. 3a is a top view of a single protective assembly in the retracted or non-extended position with the post forming the guard in the upstanding position;

FIG. 3b is a side view of the protective assembly of FIG. 3a;

FIG. 5a is a top plan view of a single support assembly;

FIG. 5b is a top plan view of the hinge plate articulated with the associated hinge receiver forming part of each support assembly;

FIG. 5c is a side elevational view of the support assembly of FIG. 5a;

Reference will now be made in detail to the present preferred embodiment of the invention, an example of which is illustrated in the accompanying drawings.

DETAILED DESCRIPTION OF THE INVENTION

Figure 1:
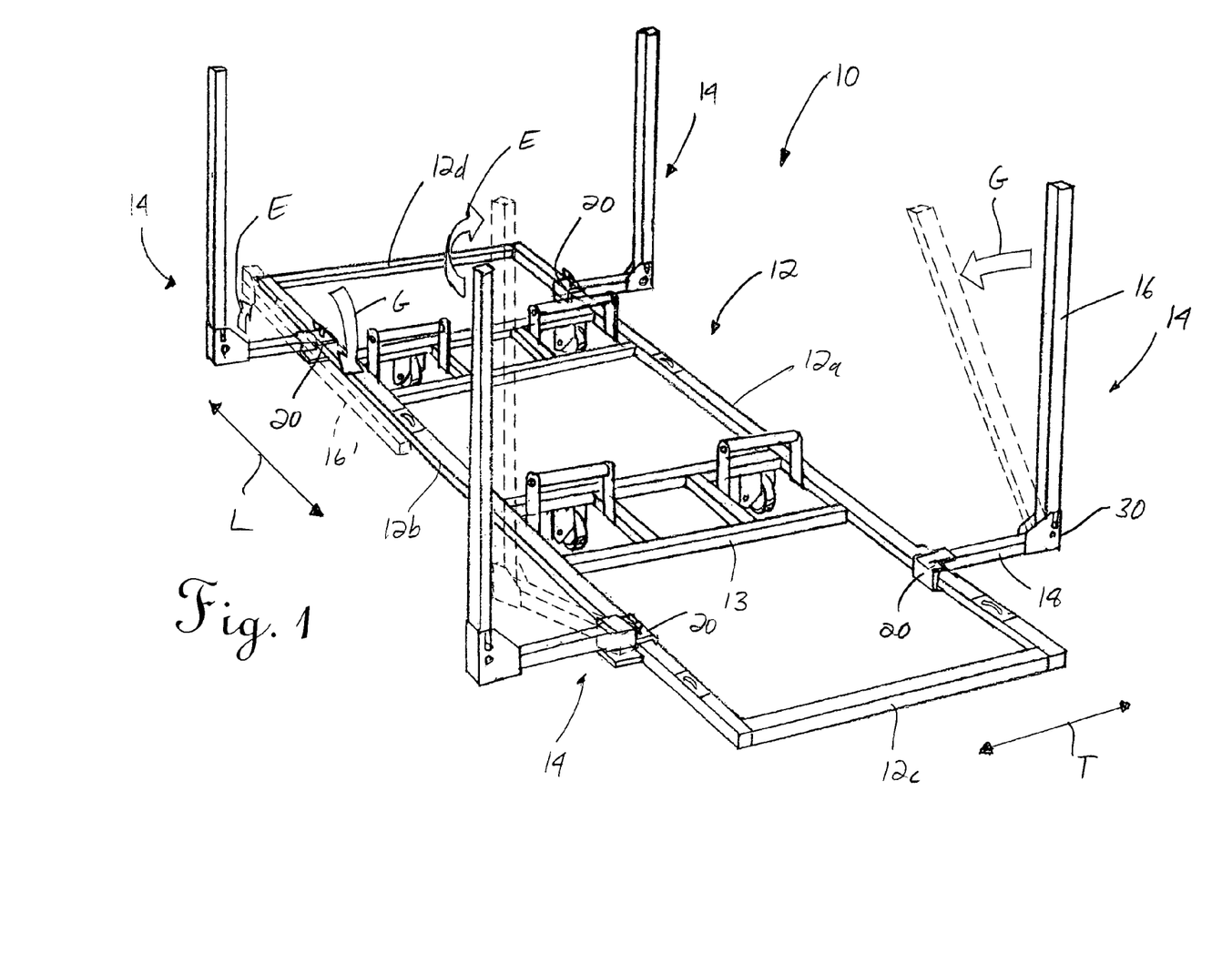
FIG. 1 is an overall perspective view of a shipping rack forming one possible embodiment of the present invention.
Figure 2:
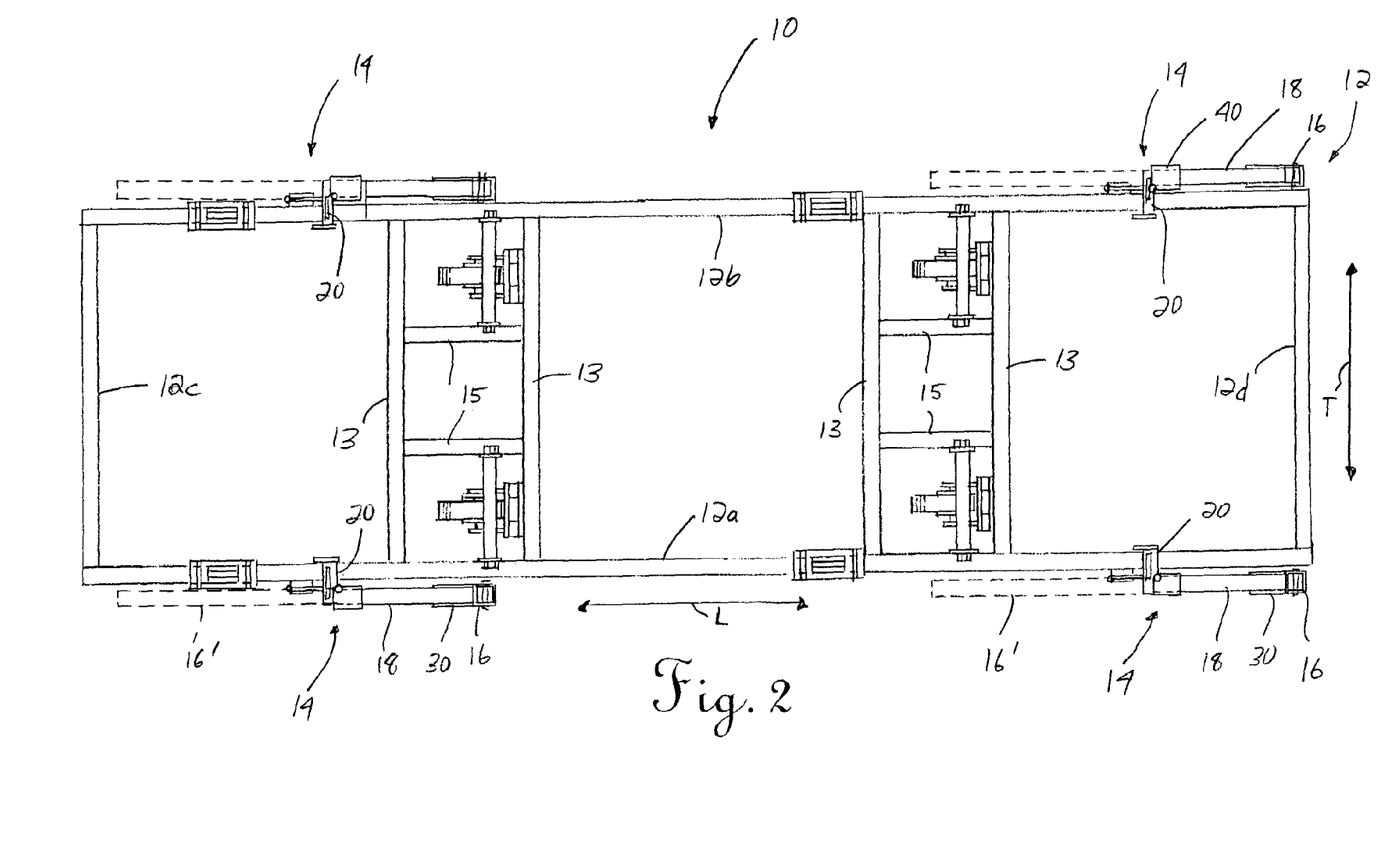
FIG. 2 is a top plan view of the shipping rack of FIG. 1.

Reference is now made to FIGS. 1 and 2, which comprise, respectively, an overall perspective view and an overall top plan view of one possible embodiment of the improved shipping rack 10 of the present invention. In this embodiment, the rack 10 includes a base in the form of a generally rectangular frame 12. The frame 12 thus includes first and second, generally opposed, elongated sides 12a, 12b defining a longitudinal direction L, as well as third and fourth, generally opposed shorter sides 12c, 12d defining a transverse direction T.

As should be appreciated, the frame 12 may be comprised of interconnected pieces of tubular bar stock, which are preferably formed of a durable metal such as steel. Conventional techniques, such as welding, may be used to secure the pieces together to form the frame 12. The pieces are preferably of suitable dimensions to form the frame 12 such that it is adapted for receiving and supporting a vehicle, such as a motorcycle M (not shown in FIG. 1, but see FIGS. 7–10) in the course of shipping in a container, such as a trailer R.

In accordance with a first aspect of the invention, one or more protective assemblies 14 are situated along at least two sides of the frame 12, and preferably the two elongated sides 12a, 12b. In the particular embodiment shown, two protective assemblies 14 lie along the first side 12a of the frame 12, and two protective assemblies 14 lie along the second side of the frame 12b. The four assemblies 14 may be substantially identical, and thus each may include a guard in the form of a generally upstanding, elongated post 16 supported at one end of an elongated arm 18. As should be appreciated, the posts 16 are of sufficient height and orientation to collectively protect the vehicle against damage from external sources or other harmful interference when positioned on the rack 10, including from adjacent racks (not shown) or other cargo being shipped.

Preferably, each arm 18 is mounted to the corresponding side 12a, 12b of the frame 12 for pivoting movement in a common horizontal plane. As a result of this mounting arrangement, each protective assembly 14 is capable of movement between a first, retracted position in which the upstanding post 16 is adjacent to the corresponding elongated side 12a, 12b of the frame 12 and a second, extended position in which the upstanding post 16 is farther away from the same side of the frame (but may remain upstanding). This pivoting feature thus allows for the selective positioning of the upstanding post 16, as necessary to protect a particular type and size of vehicle or motorcycle, as well as to accommodate vehicles having an oversized width dimension relative to the frame 12.

Figures 3A, 3B:
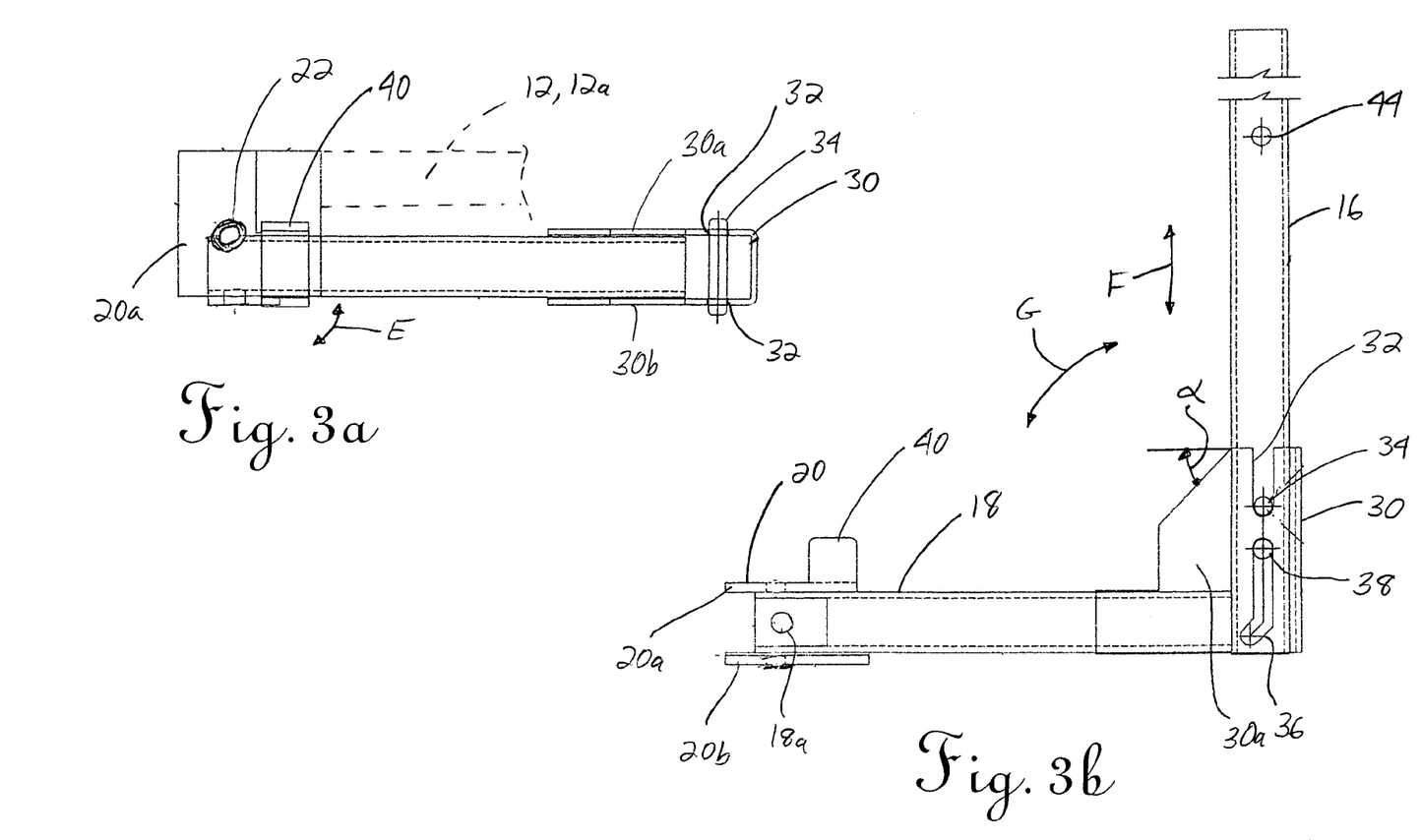

To illustrate and describe one possible manner of pivotally mounting each protective assembly 14 to the frame 12, reference is now made to FIGS. 3a and 3b. In the illustrated embodiment, each protective assembly 14 is associated with a bracket 20 attached to the elongated sides 12a, 12b frame 12 at the desired mounting location (preferably at about 20% of the length from each short side 12c, 12d, but other positions are of course possible depending on the particular application). Each bracket 20 receives a pivot structure, such as a generally cylindrical tube 22, extending at least between spaced plates 20a, 20b (and preferably through apertures formed therein) and secured to the end of the corresponding arm 18. The tube 22 thus may rotate relative to the plates 20a, 20b about an axis generally perpendicular to both the longitudinal and transverse directions L, T to permit the entire assembly 14 to move (more particularly, swing or pivot) outwardly relative to the corresponding elongated side 12a, 12b of the frame 12 (note action arrow E in FIG. 3a). This includes when the post 16 is in the generally upstanding or actuated position.

Figure 3C:
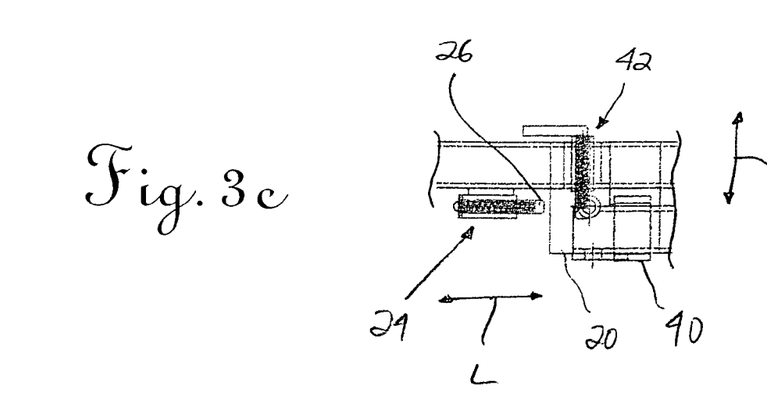
FIG. 3c is a cutaway top view of the arrangement of locking devices used to secure and maintain the protective assembly in the actuated position and the post in the collapsed position.
Figure 3D:
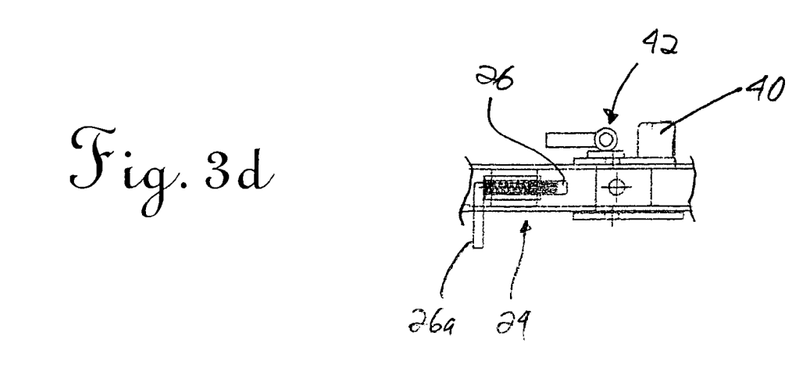
FIG. 3d is a cutaway side view of the locking devices of FIG. 3c.

To maintain or hold the assembly 14 in the extended position, especially during the course of shipping, a locking device may be provided. In the illustrated embodiment, the locking device is in the form of a spring-loaded pin assembly 24 secured to the frame 12 adjacent to each protective assembly 14. The positioning of the pin assembly 24 is such that an associated pin 26 generally aligns with the longitudinal direction L and thus may be inserted through a corresponding aperture 18a formed in the sidewall of the arm 18 (see FIGS. 3c and 3d) in the extended position. As should be appreciated from the figures, the engagement established through insertion of the pin 26 securely and reliably holds or maintains the entire protective assembly 14 in the extended position when such is desired.

Figures 4A, 4B:
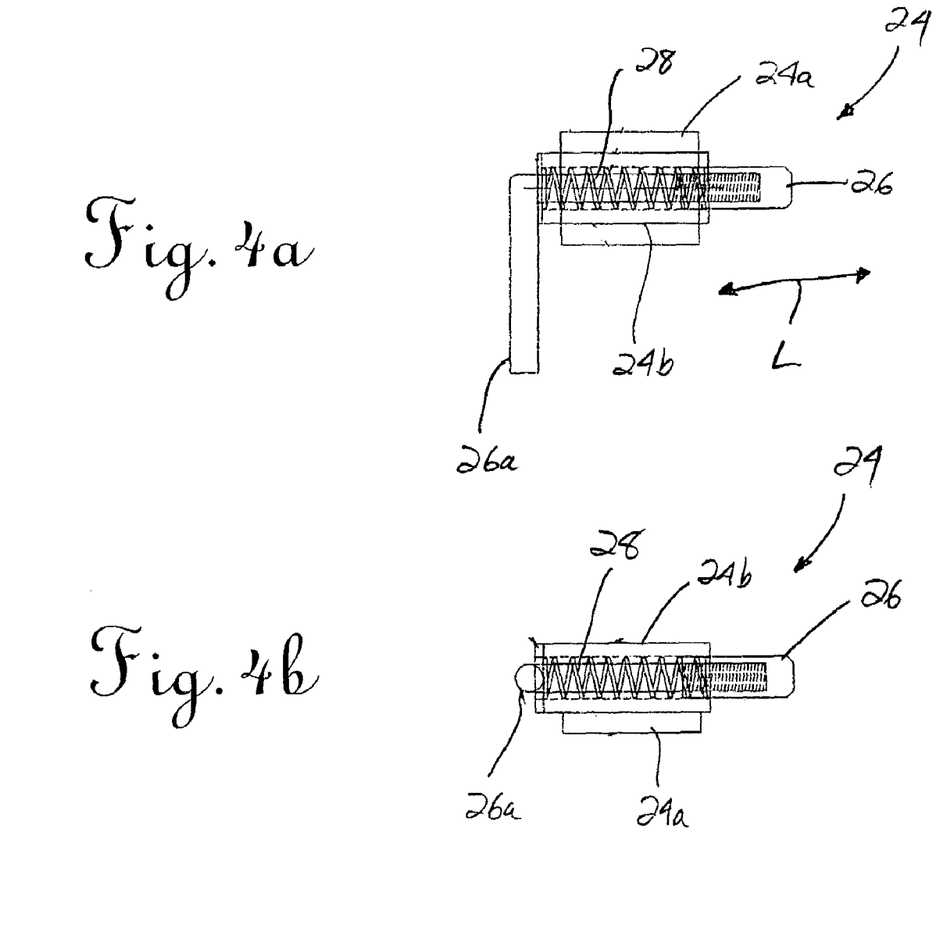
FIGS. 4a and 4b are enlarged, top and side views of an exemplary locking device.

As is further shown in FIGS. 4a and 4b, the pin assembly 24 may comprise a chassis having a mounting plate 24a and a barrel 24b for receiving a portion of the pin 26. An associated spring 28 positioned in the barrel 24b is in engagement with the pin 26 and supplies the force for biasing it in the longitudinal direction L, towards the corresponding aperture 18a. Preferably, the pin 26 has an oversized head or L-shaped portion 26a to facilitate manual grasping and pulling to overcome the biasing force created by the spring 28, such as is necessary to release the protective assembly 14 for rotation back to the retracted position adjacent to the corresponding side of the frame 12 (here, side 12a).

Turning back to FIGS. 3a and 3b, each upstanding post 16 is preferably collapsible, such that the rack 10 may assume a generally low vertical profile for storage or for purposes of loading the vehicle thereon. In the illustrated embodiment, this collapsing is facilitated by positioning the lower end of each upstanding post 16 in a generally U-shaped bracket 30 supported by the end of each arm 18. The bracket 30 includes an open-ended, U-shaped slot 32 in each spaced sidewall 30a, 30b. The U-shaped slots 32 are adapted for receiving the projecting ends of a first pin 34 passing through and secured to the lower end of the post 16. The lower end of the post 16 further includes a pair of aligned slots 36 for receiving a second pin 38 or bolt passing through aligned apertures in the bracket 30 and supported thereby. Preferably, the aligned slots 36 are J-shaped for reasons outlined in the following description.

As a consequence of this arrangement, the post 16 in the upstanding position may be raised in the vertical direction (note action arrow F) such that the first pin 34 is removed from the open end of U-shaped slots 32 while the second pin 38 negotiates or travels through the aligned, J-shaped slots. The leading upper portion including the top forward edge of each sidewall 30a, 30b of the bracket 30 slopes at an angle α relative to the horizontal plane. As should be appreciated, this slope allows the opposed ends of the first pin 34 once removed from the slots 32 to move along the longitudinal axis of the arm 18 as the post 16 is rotated toward it about the pivot point created by the second pin 38 (that is, in a counter-clockwise rotation in the view of FIG. 3b).

This pivoting or rotation (note action arrow G) continues until the post 16 generally lies in a horizontal plane parallel to the upper surface of the arm 18. Such positioning is made possible by the J-shaped slots 36, which if perfectly straight would tend to hold the lower end of the post 16 at an angle relative to the horizontal plane generally parallel to the upper surface of the arm. In other words, the post 16 when collapsed would be askew relative to the horizontal plane, especially at the end adjacent the bracket 30.

In this collapsed position (note reference numeral 16' in FIGS. 1 and 2), the upper end of the post 16 enters the upper open end of a U-shaped receiver 40 associated with the bracket 20 (see FIG. 3a). To hold or maintain the post 16 in the collapsed position, a locking device, such as a second spring-loaded pin assembly 42, may be provided on the frame 12. In this case, though, the corresponding pin 44 aligns with the transverse direction T for insertion in an aperture 44 formed in the upper end of the post 16. The construction of each second pin assembly 42 may otherwise be substantially the same as the first pin assembly 24 (see FIGS. 4a and 4b).

In accordance with a second aspect of the invention, the rack 10 may also include a plurality of support assemblies 46 selectively movable from a retracted position to an actuated position. In the illustrated embodiment, four such assemblies 46 are present to enhance the stability of the rack 10, with each positioned between a pair of cross members 13 also forming part of the frame 12. These cross members 13 are generally aligned with the transverse direction T and spaced in the longitudinal direction L. The longitudinal spacing is preferably such that each assembly 46 is free to rotate or pivot between the retracted and actuated positions while passing between the cross members 13. Support for each assembly 46 may be provided by one of the cross members 13, as outlined further in the following description.

Figures 5A, 5B, 5C:
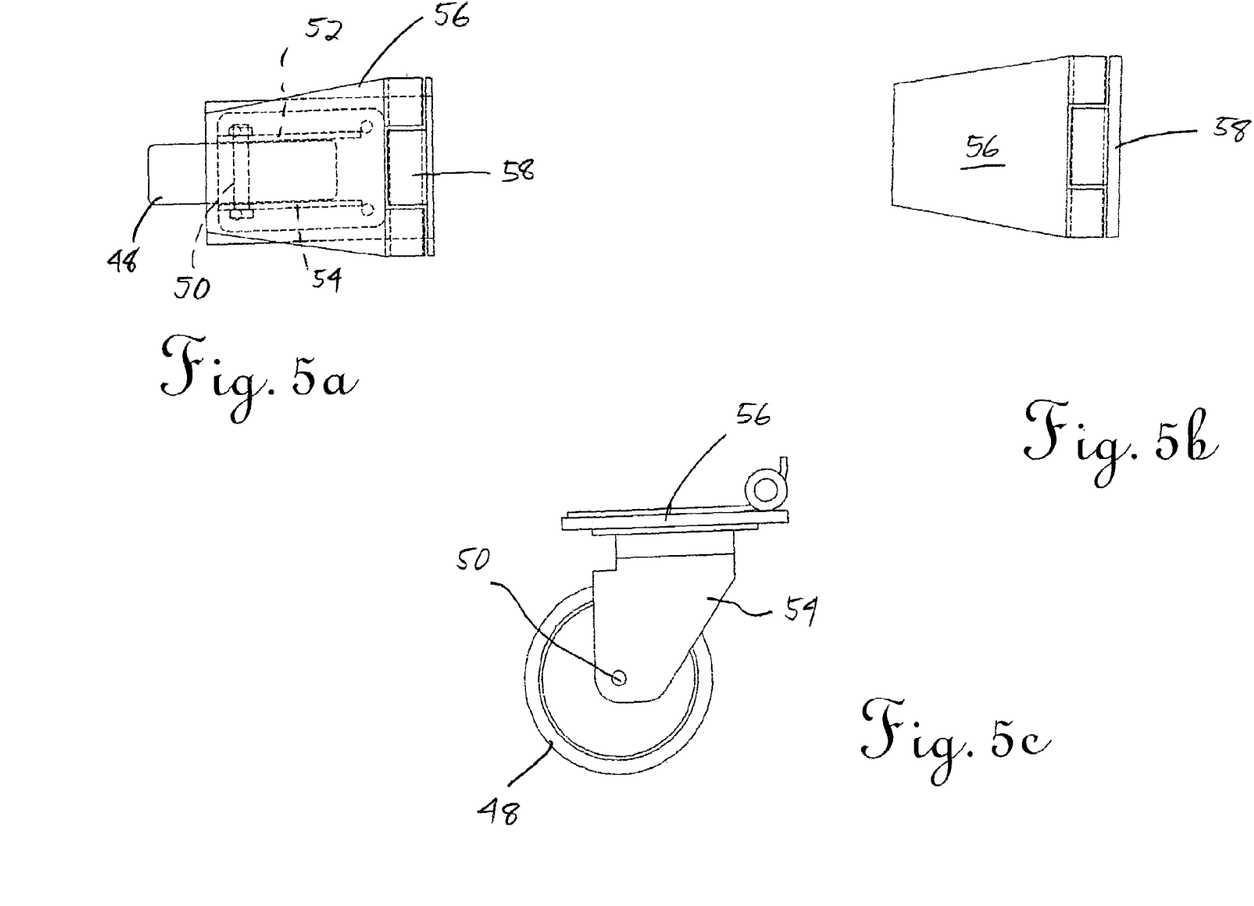

Each support assembly 46 may include a rotatably mounted wheel 48, which in the actuated position not only helps to provide support for the rack 10, but also establishes low-friction, rolling contact with the ground to facilitate moving it from one location to another (including with a vehicle such as a motorcycle M positioned thereon). The wheel 48 is rotatably supported by an axle 50, which is in turn supported by a pair of spaced plates 52, 54 depending from a common hinge plate 56. The hinge plate 56 includes lobes spaced apart to articulate with a corresponding lobe of a matching hinge pin receiver 58 adapted to be secured to the frame 12 and, more particularly, to one of the cross members 13. As should be appreciated, a corresponding hinge pin (not shown) connects the plate 56 and receiver 58 through the lobes when aligned to establish the desired relative pivoting movement that allows for selective actuation and retraction.

Figure 8:
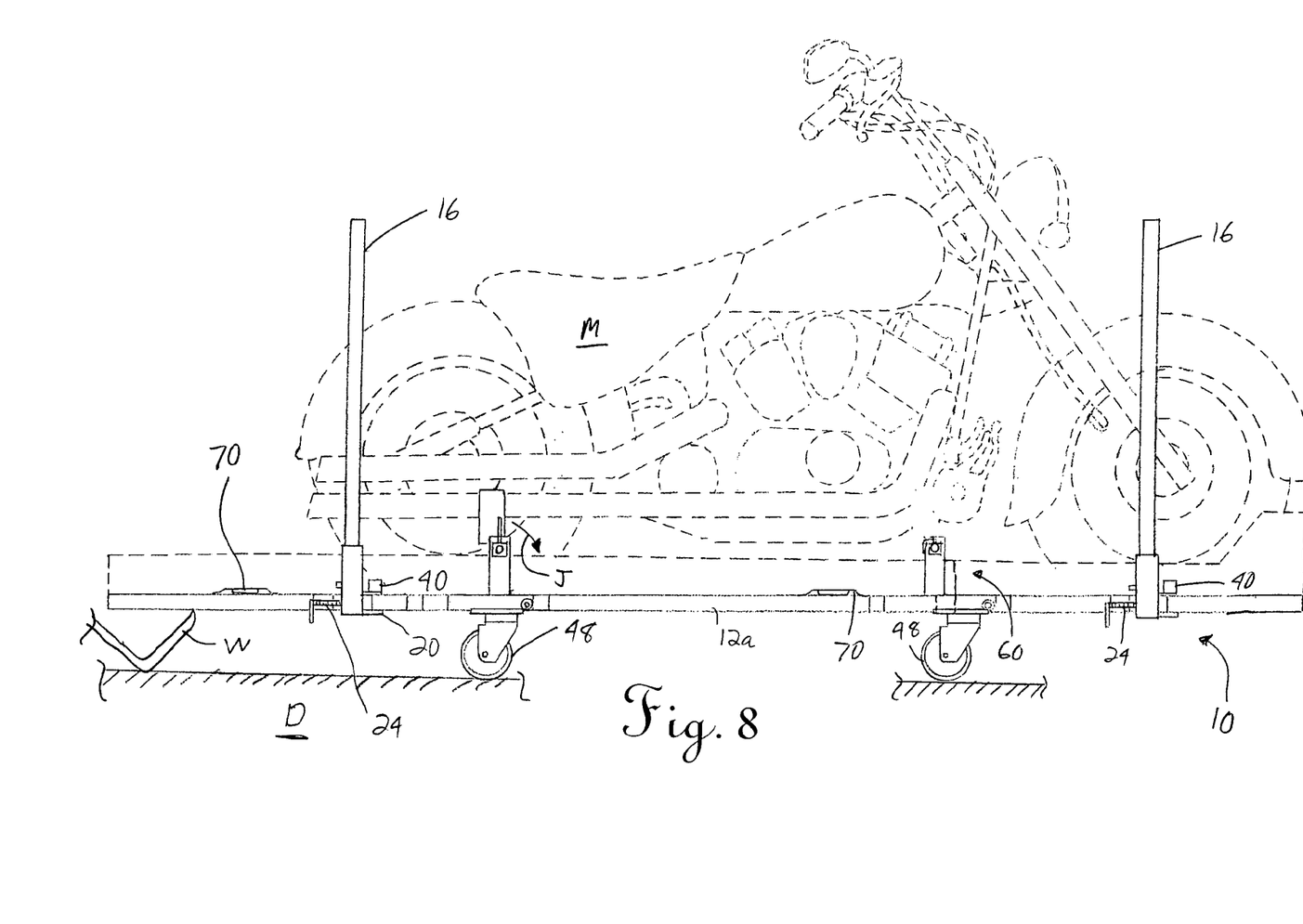
FIG. 8 is a side elevational view illustrating the manner in which the support assemblies are moved to the actuated position.
Figure 9:
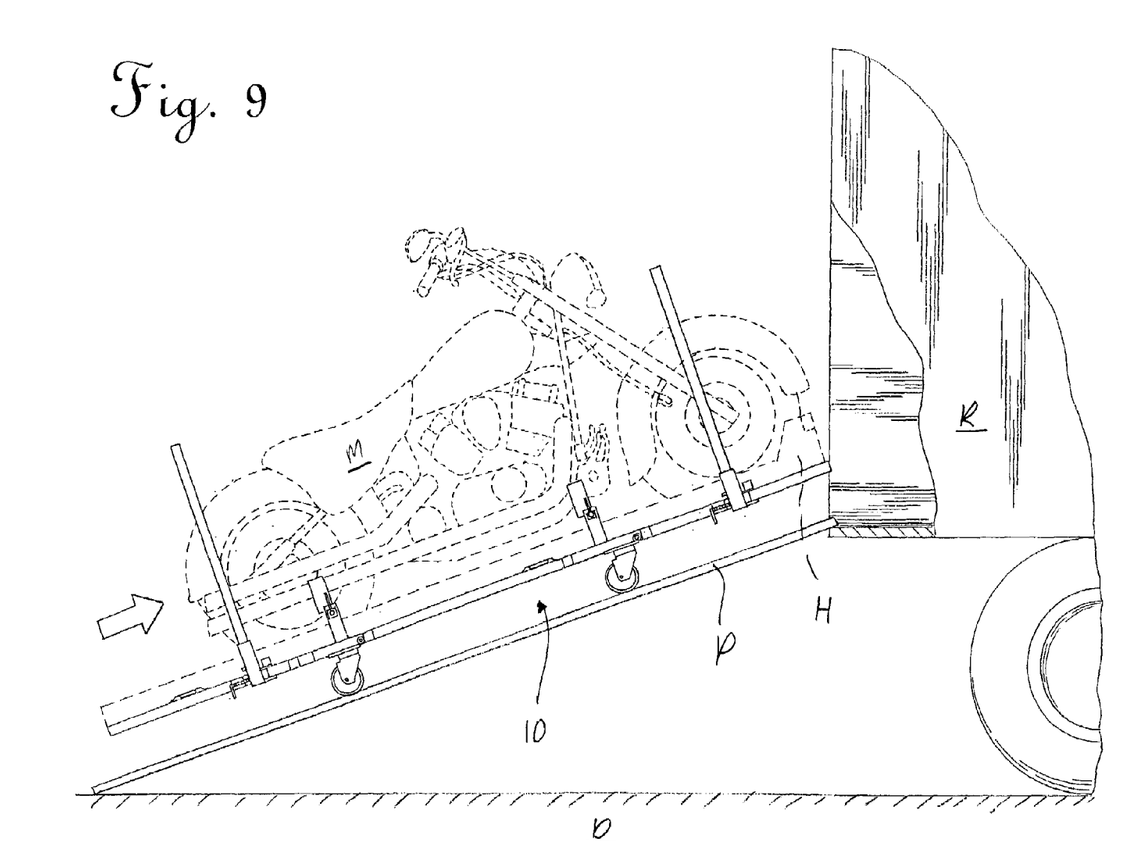
FIG. 9 is a side view showing the loading of the rack into a shipping container, such as a trailer.

In light of this arrangement, it should be appreciated that the support assemblies 46 may be pivoted or rotated between the retracted and actuated positions, such as when it is desirable to move the rack 10 with the vehicle or motorcycle M positioned or mounted on it (see FIG. 8). However, it is of course necessary to lock all actuated support assemblies 46 in place such that the rack 10 is fully supported above the ground. To accomplish this, a stop may be associated with each support assembly 46.

Figure 6A:
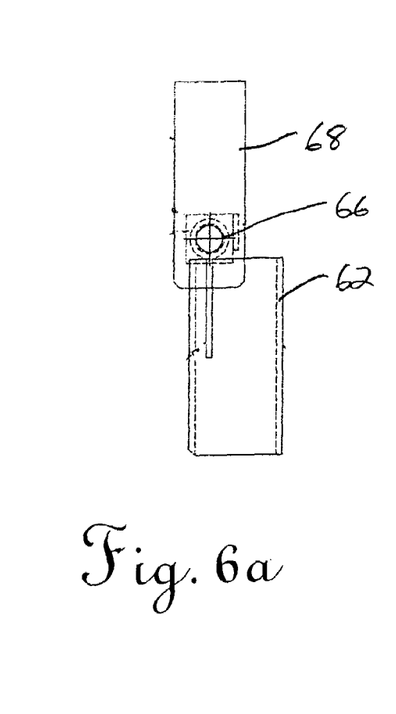
FIG. 6a is a side view of a stop assembly associated with each support assembly.
Figure 6B:
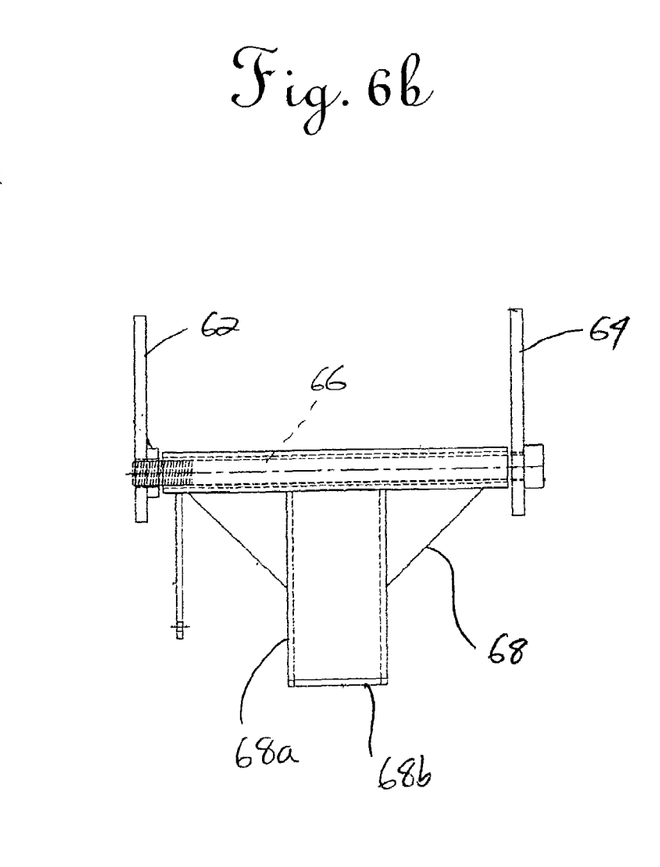
FIG. 6b is a different side view of the stop assembly.
Figure 6C:
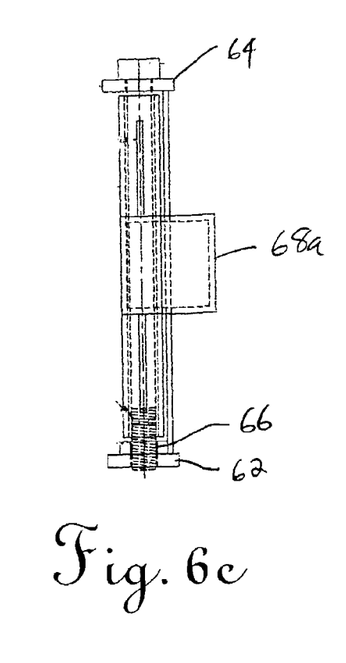
FIG. 6c is a top plan view of the stop assembly in the actuated position.
Figure 7:
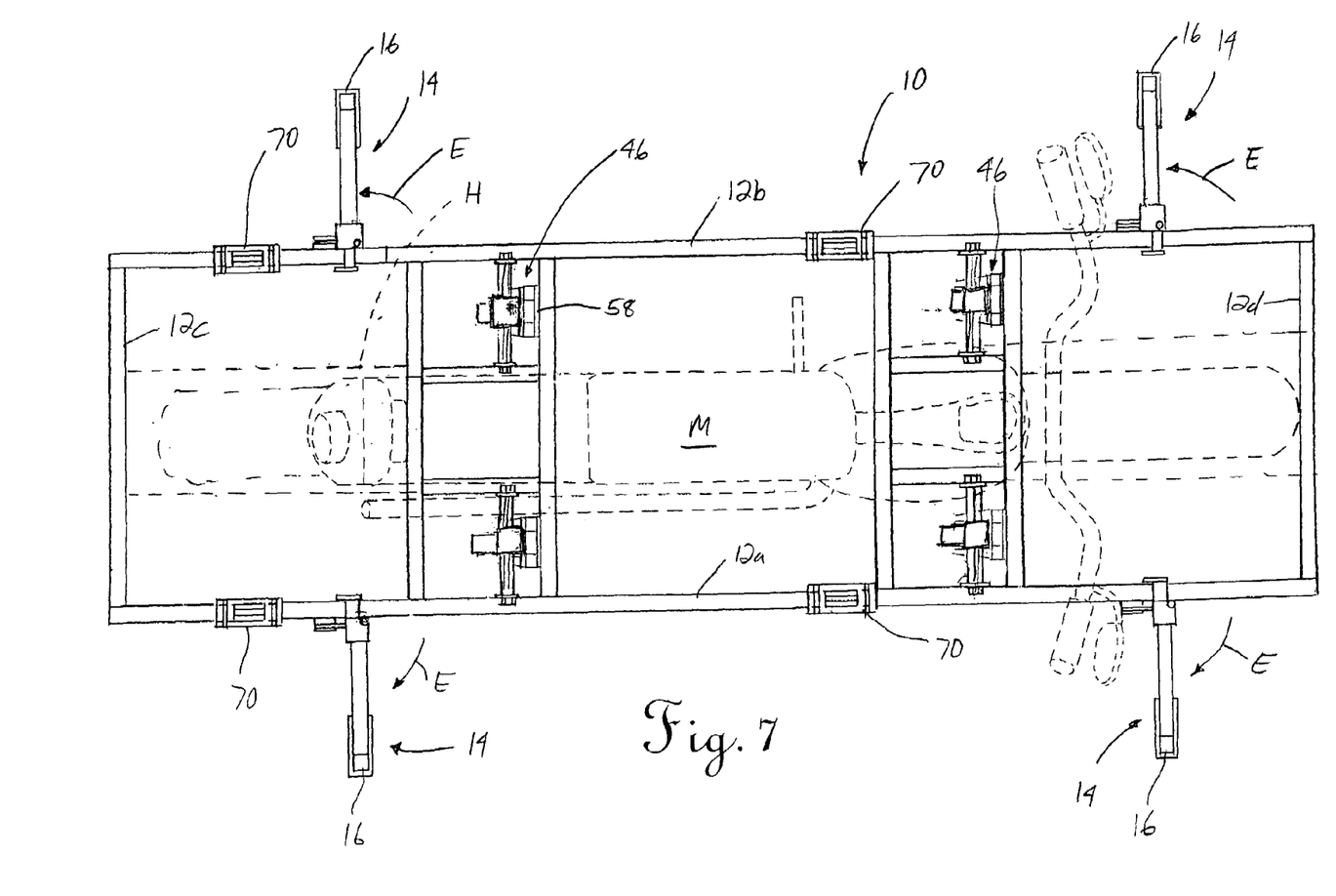
FIG. 7 is a top plan view of the rack carrying a vehicle in the form of a motorcycle.

In the illustrated embodiment, and as perhaps best understood with reference to FIGS. 6a–6c, the stop comprises an assembly 60 of structures, including a pair of spaced brackets 62, 64 supporting a pin 66 or bolt about which a stop plate 68 is mounted for pivoting rotation. The stop plate 68 includes a tubular portion 68a including a generally flat face 68b.

In use on the rack 10, the first bracket 62 of each stop assembly 60 may be attached to a first connector 15 extending between each pair of cross members 13, and the second bracket 62 may be supported by the adjacent elongated side 12a, 12b of the frame 12. The stop plate 68 is thus mounted for pivoting movement about the pin 66 between an inactive or withdrawn position in which the corresponding support assembly 46 may be retracted and an active position for maintaining the support assembly in the actuated position, such as through engagement with the upper surface of the corresponding hinge plate 56. In particular, the weight of the rack 10 and vehicle together constantly force the upper surface of the hinge plate 56 into engagement with the flat face 68b of the tubular portion of the stop plate 68a in the active position. The correspondingly large frictional force created helps to establish a secure engagement, yet one relatively easy to reverse as described further in the following discussion.

Use of the rack 10 in conjunction with a vehicle in the form of a motorcycle M is now described with reference to FIGS. 7–10. Making reference first to FIG. 7, the rack 10 may first be positioned on the ground with the stop plates 68 all withdrawn (i.e., pivoted upwardly) and each support assembly 46 retracted (which is referred to below as the low-profile "storage" position). If not already done, the posts 16 are moved from the stored position to the upstanding position and locked in place. Each protective assembly 14 may then be extended from a retracted position adjacent the corresponding portion of the frame 12 and also locked in place. With these few simple steps performed, the rack 10 is thus ready for receiving the motorcycle M.

In the illustrated embodiment, a separate support structure, such as a wooden trough H, is secured to and used to provide support for the motorcycle. The trough H may be preloaded and secured to the rack 10, or alternatively, the motorcycle M with the trough H may be loaded together. In either case, the design is preferably such that the trough H may pass between the inner brackets 62 of each stop assembly 60, and generally rests on both the cross members 13 and the front and rear sides 12c, 12d of the frame 12.

As yet another alternative, the spacing between the cross members 13 may be such that at least a portion of each wheel of the motorcycle is received therebetween. In this situation, the cross members 13 thus form a cradle for each wheel, and generally prevent relative movement in the longitudinal direction L. However, because the wheel spacing varies with different types of motorcycles, this approach does not provide the rack 10 desirable universal applicability that may be achieved using troughs H or like support structures.

In any case, once the motorcycle is positioned on the rack 10, hold down straps or the like are applied to secure it in the upright position. To facilitate attachment of the straps to the motorcycle M and/or the trough H (if present), a plurality of retainers 70 may be provided, such as on the elongated sides 12*a*, 12*b* of the frame 12. The retainers 70 may be of the buckle-style, having a central I-shaped cutout portion through which the strap is fed. The free end(s) of each strap may then be wrapped around or connected to a corresponding portion of the motorcycle to ensure that a secure connection is established. Straps may also be provided between the upstanding posts 16 and the motorcycle M, as necessary or desired.

Turning now to FIG. 8, once the motorcycle M is positioned on the rack 10, the support assemblies 46 may be actuated to place the wheels 48 in engagement with the ground D. The actuation may be accomplished by placing a lever (such as a crow bar W) or other device for supplying suitable force for lifting the rack 10 in the vertical direction (such as a jackscrew) under corresponding side(s) 12*a*–12*d* of the frame 12. Once the frame 12 is raised to the appropriate height, the corresponding support assemblies 46 are moved (pivoted) to the actuated position. The associated stop assembly 60 is then effectively used to lock the support assembly 46 in the actuated position (note action arrow J with left hand stop assembly 60 and compare with the right hand stop assembly 60 in the actuated position). Once locked and held securely in place, the lever (crow bar W) or other lifting device may be withdrawn. This operation may then be repeated as necessary to actuate the remaining support assemblies 46, such that the frame 12 is supported above the ground D.

Figure 10:
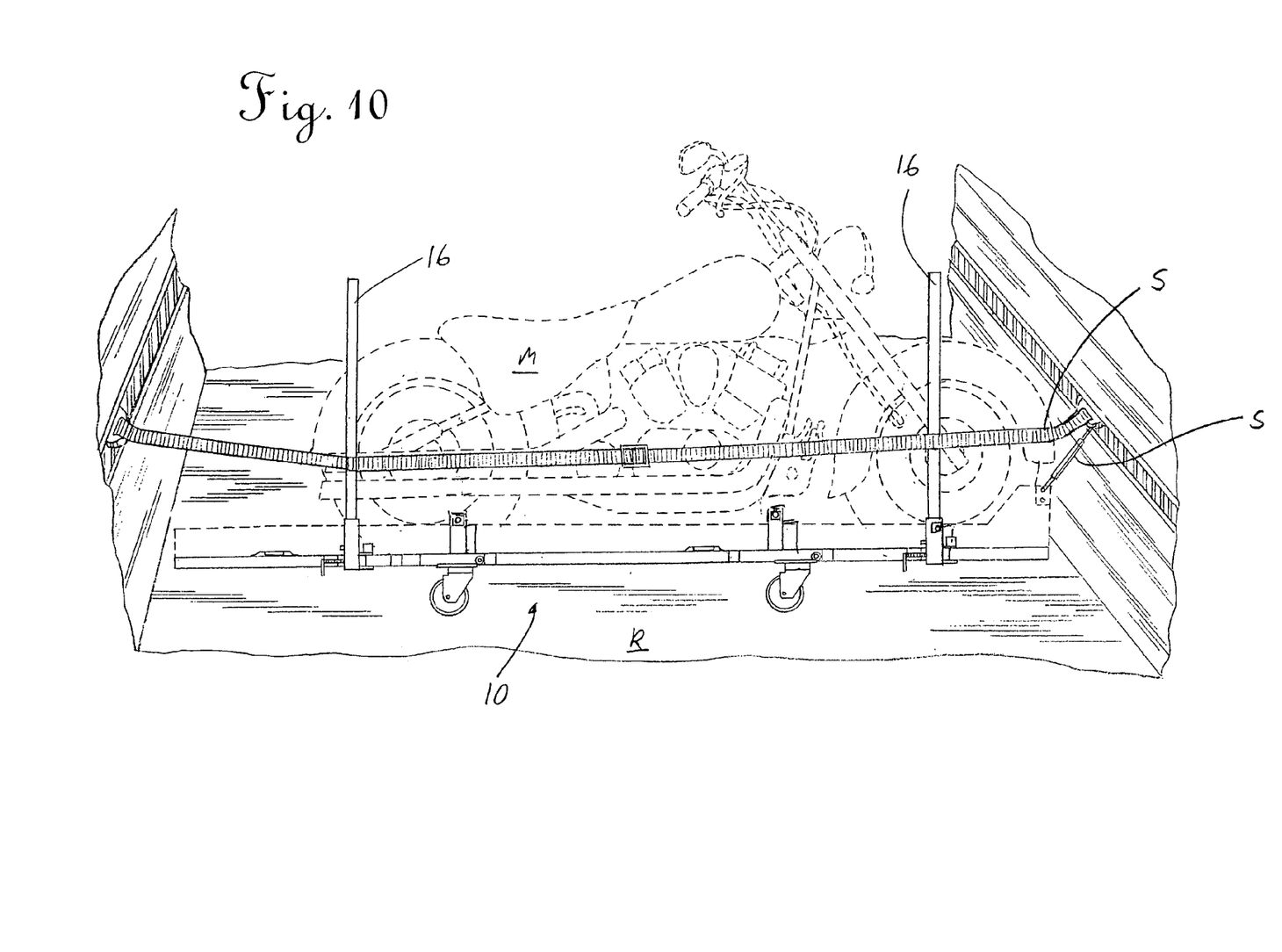
FIG. 10 is a perspective view showing the rack turned sideways in a shipping container.

With low-friction, rolling contact thus established between the wheels 48 and the ground D, the rack 10 carrying the motorcycle M can thus be moved about as necessary or desired. For example, as shown in FIG. 8, the loaded rack 10 may be pushed up the ramp P into a shipping container, such as a trailer R. Once in the container, the wheels 48 also facilitate turning the rack to the desired orientation, such as sideways as shown in FIG. 10. The support assemblies 46 may then be retracted to place the rack 10 in engagement with the floor of the container and essentially fix its position during shipping. Alternatively, the support assemblies 46 may remain in the actuated position, in which case straps S connected to the container are used to hold both the rack 10 and any trough H present in place during shipping (and to prevent both structures from "bumping" or moving up and down during transit, which enhances stability and further lessens the chance of damage to the motorcycle M). In any case, it is noted that the guards in the form of upstanding posts 16 at all times protect against external interference, including from adjacent racks, any straps S, or other cargo present.

When the off-load point is reached, the above-described operations are generally reversed as necessary to facilitate unloading of the cargo. If the frame 12 is resting on the ground, the support assemblies 46 are actuated as described above using a tool or other lifting device. Each rack present is then unloaded from the container, which in the case of a trailer R typically involves lowering it down the ramp P. In the case where the offload point is a dealer's place of business, the support assemblies 46 in the actuated position allow the rack 10 to be rolled right into the showroom and unloaded. The past need for a forklift or similar device to either load or unload the rack 10 with the associated vehicle is thereby wholly obviated.

After unloading the vehicle, the protective assemblies 14 may each then be moved to the retracted position by releasing the corresponding pin assembly 24 and pivoting the associated arm 18 to a position adjacent the side of the frame 12. One in the retracted position, the posts 16 may then be collapsed and secured in place using the other pin assembly 42. The rack 10 may then be returned to the shipping container or wheeled to another location for storage. In the container or storage location, the support assemblies 46 may of course be retracted. In this case, the rack 10 thus assumes a relatively low profile when not in use, yet is easily made ready for shipping a vehicle.

As should be further appreciated, it is possible to retrofit the protective assemblies 14 and support assemblies 46 onto existing racks patent, the brackets 20 corresponding to the protective assemblies 14 are simply secured to the sides of the rack, as is the hinge receiver 58 associated with each support assembly 46. The securing may be by welding or other known techniques.

The foregoing description of various embodiments of the present invention has been presented for purposes of illustration and description. The description is not intended to be exhaustive or to limit the invention to the precise forms disclosed. Obvious modifications or variations are possible in light of the above teachings. For example, the wheels are shown as being mounted for in-line rotation, but caster wheels could easily be substituted. A ramp or wedge of the type disclosed in the Fritze patent for bridging any gap between the ground and the rack 10 (including when in the raised position) could also be effectively utilized to facilitate loading of the motorcycle. The embodiments described provide the best illustration of the principles of the invention and its practical applications to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

The invention claimed is:

1. An apparatus for intended use in the course of shipping a vehicle, comprising:
   a base supporting the vehicle above the ground, said base including opposed first and second sides; and
   at least one guard supported by said base capable of a first movement from a retracted position adjacent the first side of the base to an extended position farther away from the first side and a second movement from a collapsed position to an extended upstanding position, whereby the at least one guard moves from the retracted position to the extended upstanding position via said two separate movements and assists in protecting the vehicle from being damaged during shipping.

2. The apparatus of claim 1 further comprising a plurality of retractable supports for supporting said base above the ground during movement.

3. The apparatus of claim 1, wherein the base is a generally rectangular frame; and
   wherein said opposed first and second sides are elongated defining a longitudinal direction, and third and fourth sides define a transverse direction.

4. The apparatus of claim 3, further including a plurality of support assemblies mounted to the frame for movement to an actuated position in which the assemblies support the frame above the ground.

5. The apparatus of claim 4, wherein each support assembly includes a rotatably mounted wheel supported by a hinge plate secured to the frame for pivoting movement about an axis aligned with the transverse direction.

6. The apparatus of claim 5, further including a stop associated with each support assembly, each stop having a first, inactive position for allowing the corresponding support assembly to retract and a second, active position for maintaining each support assembly in the actuated position.

7. The apparatus of claim 6, wherein the frame includes two pairs of cross members aligned with the transverse direction, each pair defining a space capable of receiving at least a portion of each vehicle wheel so as to prevent movement in the longitudinal direction.

8. The apparatus of claim 7, wherein the frame includes a pair of connectors extending between each pair of cross members, wherein each support assembly is mounted to one of the pair of connectors and a corresponding elongated side of the frame for pivoting movement between the cross members.

9. The apparatus of claim 1, wherein the at least one guard is attached to an arm mounted to the first side of said base for pivoting movement in a common plane with the base from the retracted position to the extended position.

10. The apparatus of claim 9, wherein the at least one guard is removably secured to an open-ended receiver supported by the arm, the receiver including aligned slots for receiving a first pin associated with the at least one guard and a pair of aligned apertures for receiving a second pin extending through a pair of aligned, J-shaped slots formed in the at least one guard, whereby the second pin negotiates through the J-shaped slots when the at least one guard is raised and then lowered to the collapsed position.

11. The apparatus of claim 1 in combination with a removable trough at least partially supporting the vehicle in an upright position.

12. The apparatus of claim 1 in combination with the vehicle.

13. An apparatus for intended use in shipping a vehicle, comprising:
  a base adapted for receiving and supporting the vehicle above the ground, said base including first and second opposed sides;
  a respective guard associated with each side of the base, each said guard movable from a retracted position adjacent a corresponding side of the base to an extended position farther away from the corresponding side and movable from a collapsed position in a plane substantially defined by the base to an upstanding position for protecting the vehicle when positioned on the base; and
  a plurality of support assemblies, each including a rotatable wheel and being mounted to the base for pivoting movement between a retracted position and an actuated position in which the wheel helps to support the base above the ground,
  whereby the base may rest on the ground when the support assemblies are in the retracted position and the wheels facilitate moving the apparatus, including with the vehicle, when the assemblies are in the actuated position.

14. The apparatus of claim 13, wherein each support assembly includes a transverse axle rotatably supporting the wheel, the axle being supported by a hinge plate secured to the base for pivoting movement.

15. The apparatus of claim 13, further including a stop associated with each support assembly, the stop having a first inactive position for allowing the corresponding support assembly to retract and a second active position for maintaining each support assembly in the actuated position.

16. The apparatus according to claim 13, wherein the base comprises a generally rectangular frame.

17. The apparatus of claim 16, wherein each individual guard is supported by an arm mounted to a corresponding side of the frame for pivoting movement.

18. The apparatus of claim 17, wherein each individual guard is removably secured to a receiver supported by the arm, the receiver including aligned slots for receiving a first pin associated with each individual guard and a pair of aligned apertures for receiving a second pin extending through a pair of aligned, J-shaped slots formed in each individual guard, whereby the second pin is captured in and negotiates the J-shaped slots as each individual guard moves to the collapsed position.

19. An apparatus for intended use in the course of shipping a vehicle, comprising:
  a generally rectangular frame substantially defining a plane and adapted for receiving and supporting the vehicle above the ground;
  means for protecting the vehicle against damage when positioned on the frame including at least one guard per each said first and second elongated sides, each guard pivotally mounted for movement from a retracted position adjacent a corresponding side of the frame to an extended position farther away from the corresponding side and from a collapsed position in said plane to an upstanding position; and
  selectively actuated means for both supporting the frame above the ground when actuated and facilitating movement of the frame over the ground with low-friction, rolling contact.

20. The apparatus according to claim 19, wherein the protecting means further includes said each guard attached to an arm mounted to a first side of said frame for pivoting movement in said plane from the retracted position to the extended position.

21. The apparatus according to claim 19, wherein the movement facilitating means comprises a plurality of support assemblies, each including a rotatable wheel and being mounted to the frame for pivoting movement between a retracted position and an actuated position in which the wheel helps to support the frame above the ground.

22. A method of retrofitting an existing shipping rack for a motorcycle, comprising:
  mounting a protective assembly including a respective post along at least two different sides of the rack, each post being pivotally mounted from a retracted position adjacent one of the at least two different sides of the rack to an extended position farther away from the one of the at least two different sides and being pivotally mounted from a collapsed position to an upstanding position; and
  pivotally mounting a plurality of selectively actuated support assemblies to the rack, each including a rotatably mounted wheel,
  whereby the posts in the upstanding position may protect the motorcycle against damage and the wheels may engage the ground to provide low-friction, rolling contact to facilitate moving the rack and the motorcycle together.

23. The method of claim 22, wherein the selective actuation includes pivoting the support assembly from a first, retracted position to a second, extended position.

* * * * *